US006698690B2

United States Patent
Novak et al.

(10) Patent No.: US 6,698,690 B2
(45) Date of Patent: Mar. 2, 2004

(54) IMPACT RESISTANT DOOR CONTAINING RESEALABLE PANELS

(75) Inventors: Miloslav Novak, Glenshaw, PA (US); Andrew B. Trageser, Pittsburgh, PA (US); Russell S. Long, Murrysville, PA (US); Jerri F. McMichael, New Kensington, PA (US); Eric F. M. Winter, Pittsburgh, PA (US); Kenneth B. Balazic, Bethel Park, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/310,217

(22) Filed: Dec. 4, 2002

(65) Prior Publication Data

US 2003/0160130 A1 Aug. 28, 2003

Related U.S. Application Data

(60) Provisional application No. 60/361,017, filed on Feb. 28, 2002.

(51) Int. Cl.⁷ .............................................. B64D 11/00
(52) U.S. Cl. .................. 244/121; 244/118.5; 244/129.5
(58) Field of Search .......................... 244/117 R, 118.5, 244/119, 129.4, 129.5, 121; 49/31, 141; 89/36.02; 109/2, 6, 77, 49.5, 64, 67–70

(56) References Cited

U.S. PATENT DOCUMENTS

| 3,616,115 A | 10/1971 | Dayton ........................ 15/332 |
| 3,704,845 A | * 12/1972 | Ord .......................... 244/118.5 |
| 4,598,647 A | 7/1986 | Biedess ....................... 109/77 |
| 4,813,334 A | 3/1989 | Bloks et al. ............... 89/36.02 |
| 4,899,960 A | * 2/1990 | Hararat-tehrani et al. 244/118.5 |
| 5,085,017 A | * 2/1992 | Hararat-Tehrani ........ 244/118.5 |
| 5,142,997 A | 9/1992 | DeLong et al. ............ 109/49.5 |
| 5,471,905 A | 12/1995 | Martin ...................... 89/36.02 |
| 5,808,228 A | 9/1998 | Beschle et al. ............ 89/36.02 |
| 6,186,444 B1 | 2/2001 | Steel ........................ 244/129.5 |
| 6,336,293 B1 | * 1/2002 | Kamimura ................... 49/171 |
| 6,474,599 B1 | * 11/2002 | Stomski .................... 244/118.5 |
| 2003/0047648 A1 | * 3/2003 | Batt et al. ................ 244/118.5 |
| 2003/0052227 A1 | * 3/2003 | Pittman .................... 244/118.5 |
| 2003/0066930 A1 | * 4/2003 | Pratt et al. ............... 244/118.5 |

* cited by examiner

Primary Examiner—Galen L. Barefoot
(74) Attorney, Agent, or Firm—David P. Maivald

(57) ABSTRACT

A two layer door is provided. The first layer is made of a plurality of metallic members with a portion of the metallic members having one or more channels adapted to receive one or more armor panels. The second layer is made of the channels of the metallic members and armor panels disposed within the channels. The door also has one or more pivotally attached panels to the door that are adapted to open at a preselected pressure differential across the door. The door is also available as a kit.

19 Claims, 20 Drawing Sheets

IMPACT RESISTANT DOOR CONTAINING RESEALABLE PANELS

PARENT CASE TEXT

This application claims priority under 35 U.S.C. §119(e)(1) of Provisional Application No. 60/361,017, filed Feb. 28, 2002.

FIELD OF THE INVENTION

This invention relates to impact resistant doors. More particularly, this invention relates to impact resistant doors that are resistant to blunt forces and projectiles. The invention also relates to impact resistant doors that contain resealable panels for equalization of air pressure across the door.

BACKGROUND OF THE INVENTION

On Sep. 11, 2001, two hijacked airlines slammed into the World Trade Center towers in New York, one hijacked airliner crashed into the Pentagon in Washington, D.C. and another hijacked airliner fell from the sky into a rural field in Pennsylvania. These terrorist acts led to one of the greatest losses of human life in the United States. In response to the tragedy, new Federal Aviation Administration ("FAA") regulations were issued directed to aircraft cockpit door security. These regulations are currently set forth at Title 14, Code of Federal Regulations (14 CFR) part 25, §§25.365, 25.771, 25.772, 25.795, 25.803 and 25.853, part 91, §91.11 and part 121, §§121.313 and 121.587 and commentary associated with these regulations is set forth in the Federal Register. (collectively, the "Regulations") Additionally, Advisory Circular 25.795-1 and Advisory Circular 25.795-2 were published by the FAA. Advisory Circular 25.795-1 sets forth examples of acceptable means for demonstrating compliance with the provisions of the airworthiness standards for transport category airplanes related to the airplane design for cockpit intrusion resistance. Advisory Circular 25.795-2 sets forth examples of acceptable means of demonstrating compliance with the provisions of the airworthiness standards for transport category airplanes related to the airplane design for cockpit penetration resistance. (collectively, Advisory Circular 25.795-1 and Advisory Circular 25.795-2 shall be known as "AC") The invention described herein is intended to provide examples of impact resistant doors that contain resealable panels that meet or exceed the requirements of the Regulations and/or the AC.

SUMMARY OF THE INVENTION

It is an object of the present invention to provide a door that is impact resistant.

It is an additional object of the present invention to provide a door that is resistant to blunt forces and projectiles.

It is yet an additional object of the present invention to provide a door that contains resealable panels for equalization of air pressure across the door.

It is yet a further object of the present invention to provide a door with the foregoing objects that is available as a kit.

It is yet a further object of the present invention to provide a door that meets or exceeds the requirements of the Regulations.

It is yet a further object of the present invention to provide a door that meets or exceeds the requirements of the AC.

These and other objects of the invention are achieved with a two layer door. The first layer is made of a plurality of metallic members with a portion of the metallic members having one or more channels adapted to receive one or more armor panels. The second layer is made of the channels of the metallic members and armor panels disposed within the channels. The door also has one or more pivotally attached panels to the door that are adapted to open at a preselected pressure differential across the door. The door is also available as a kit.

DETAILED DESCRIPTION OF PREFERRED EMBODIMENTS

The invention described herein will be understood by those of skill in the art with reference to the above FIGS. It will be readily apparent to those of skill in the art that the invention described herein is merely an example of an impact resistant door that is intended to meet or exceed the requirements of the Regulations and/or the AC. The preferred embodiments of this invention illustrated in the FIGS. are not intended to be exhaustive or to limit the invention to the precise form disclosed. It is chosen to describe or to best explain the principles of the invention and its application and practical use to thereby enable others skilled in the art to practice the invention. For example, reference is made herein to use of the present invention as a door that is located between the cabin and the cockpit or flight deck in an airplane. While particular attention is drawn to the details of a door used in an airplane, it will be readily appreciated that the door may be used in other vehicles as well.

Figure 1:
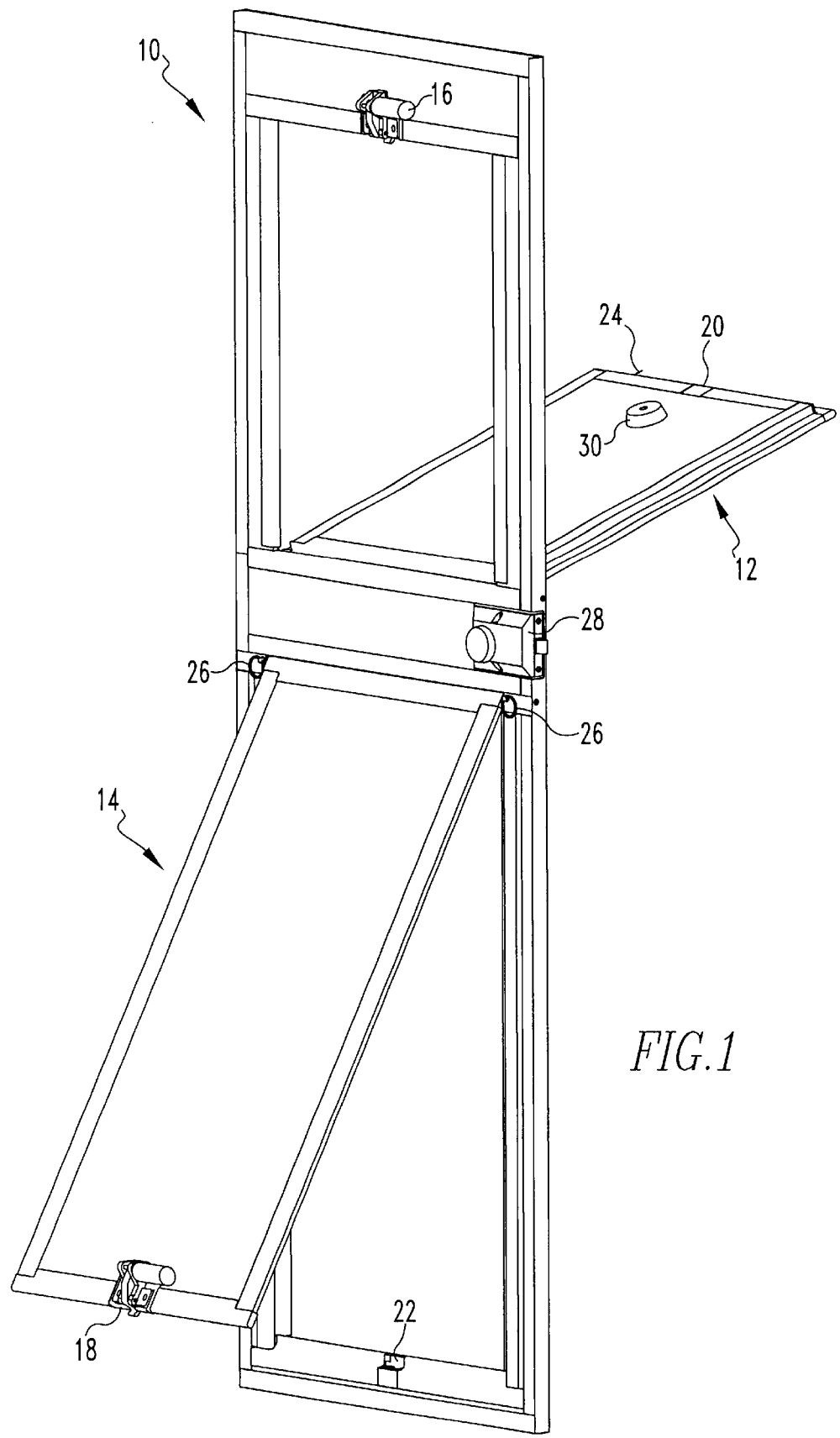
FIG. 1 is an illustrated view of the door of the invention showing the first and second panels in an open position.

FIG. 1 displays a door 10 of the present invention showing a first panel 12 and a second panel 14 in an open position. FIG. 1 displays both panels 12 and 14 in an open position; however, in operation, the panels 12 and 14 do not simultaneously open during a decompression event as described below.

Securing the panels 12 and 14 in a closed position are a first latch assembly 16 and a second latch assembly 18 that are mounted as shown in FIG. 1. The latch assemblies 16 and 18 secure the panels 12 and 14 by respectively engaging a first strike plate assembly 20 and a second strike plate assembly 22. The latch assemblies 16 and 18 are adapted to release the panels 12 and 14 when a predetermined pressure differential exists between the cabin side and cockpit side of the door 10. Other similar latches could be used that would be considered to fall within the scope of this invention.

The panels 12 and 14 are pivotally attached to the door 10 by hinge assemblies which are described in greater detail below. In operation, the panels 12 and 14 operate in the event of decompression as follows. During decompression of the cabin, the first panel 12 swings open into the cabin after first latch assembly 16 releases the first panel 12 from a position of being flush with the door 10. The second panel 14 remains flush with the door 10 during decompression of the cabin. A cable 24 permits the first panel 12 to open to an angle sufficient to vent the pressure differential between the door 10 until the pressure on both sides of the door 10 is equalized. Additionally, the cable 24 may permit the first panel 12 to open to an angle sufficient to prevent a projectile from being sent into the cockpit or a person from gaining access to the cockpit during the decompression event. Upon pressure equalization, the first panel 12 is returned to a position flush with the door 10 by an airline employee or passenger and is secured by the first latch assembly 16 engaging the first strike plate assembly 20 to prevent entry into the cockpit by a person or projectile after the decompression event. Also, the second panel 14 is secured by the second latch assembly 18 engaging the second strike plate assembly 22 after pressure equalization by an airline employee or a passenger to prevent entry into the cockpit by a person or projectile after the decompression event. Alternatively, the first panel 12 may be returned to a position flush with the door 10 by force applied to the first panel 12 by a retractable spring loaded cable or another similar device to prevent entry into the cockpit by a person or projectile after pressure equalization in the airplane. Additionally, cable 24 is stowed away within the first panel 12 by the person closing the first panel 12. Alternatively, cable 24 may be stowed away within the first panel 12 by a spring (not shown) in the first panel 12 that is attached to the cable 24. The cable 24 prevents the first panel 12 from being detached from the door 10 by the force applied between the first panel 12 and the door 10 during decompression.

Likewise, the second panel 14 operates in a similar fashion to the manner in which the first panel 12 operates. For the sake of being concise, the operation of the second panel 14 will not be discussed in detail herein because one of ordinary skill in the art would understand that the second panel 14 functions in a similar fashion to the manner of operation of the first panel 12 by reference to FIG. 1. As points of distinction between the first panel 12 and the second panel 14, a cable such as cable 24 is not required in the operation of the second panel 14 because the weight of the second panel 14 prevents the second panel 14 from being removed from the door 10 during decompression. Optionally, the second panel 14 could contain a cable such as cable 24. Additionally, the second panel 14 is adapted to open into the cockpit during decompression of the cockpit and the first panel 12 remains flush with the door 10 during decompression of the cockpit. The procedures for securing the panels 12 and 14 after pressure equalization of a cockpit decompression event are the same as the procedures for securing the panels 12 and 14 after pressure equalization of a cabin decompression event. In the interest of being concise, those procedures will not be repeated here. In an alternate embodiment, the door 10 may be additionally equipped with additional biasing devices such as springs and the like to assist in rapidly opening panels 12 and 14 in a decompression event. Other elements shown on FIG. 1 is a hinge pin release assembly 26, a door lock 28 and an optional viewer assembly 30.

Figure 7:
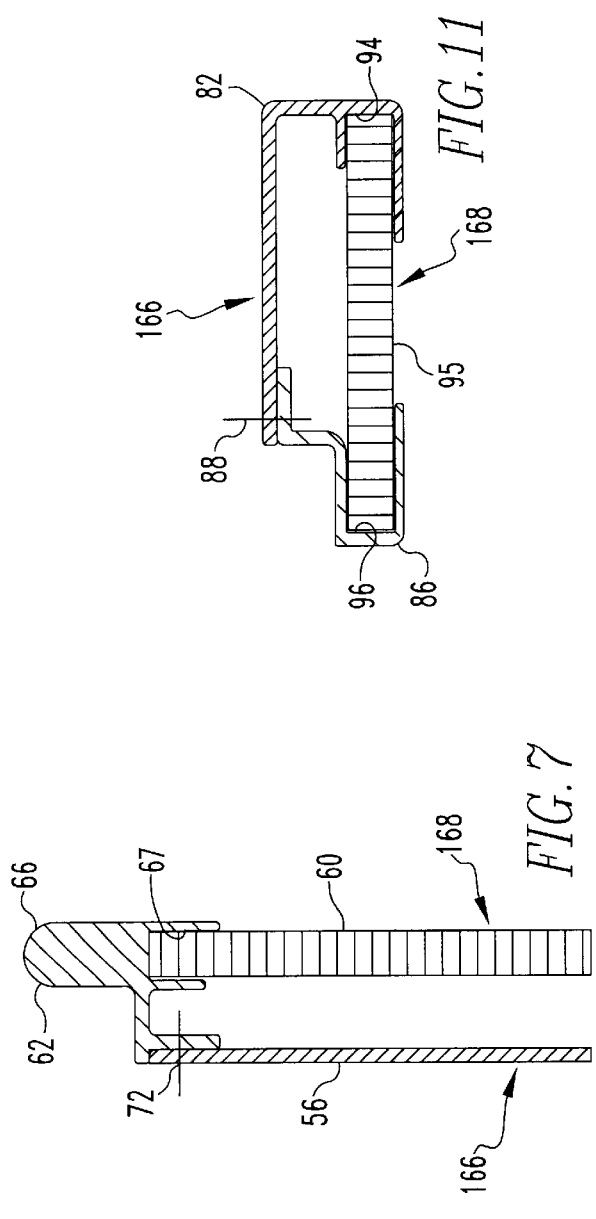
FIG. 7 is a side sectional view taken along line 7—7 of FIG. 6 showing structural members of the door, namely, extrusions and armor panel in greater detail.
Figure 9:
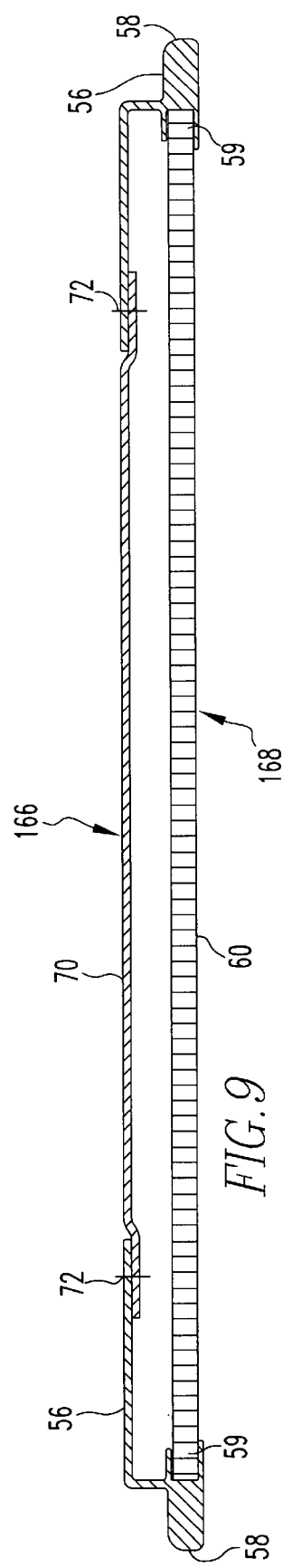
FIG. 9 is a sectional view taken along line 8—8 of FIG. 8 showing structural members of the door, namely, extrusions, sheet and armor panel in greater detail.
Figure 8:
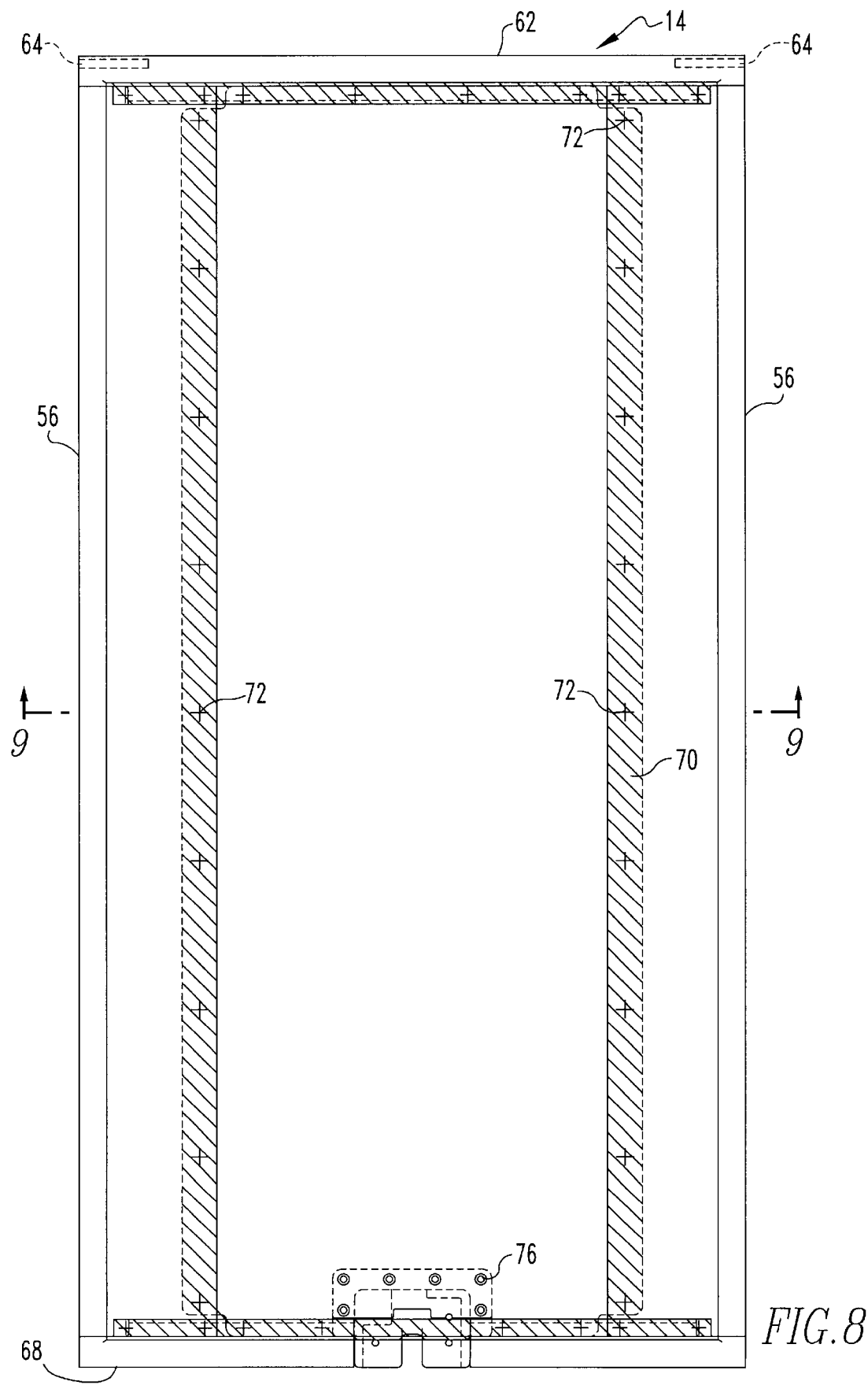
FIG. 8 is a front view of the cabin side of the second panel of the door with the hatching showing adhesive that has been applied to various components to secure various components together.

FIGS. 2–5 show the various components of the first panel 12 of the door 10 in an assembled relationship. The first panel 12 is constructed of a pair of extrusions 32 that have a flange 34 and a channel 35 adapted to receive an armor panel 36, a hinge side extrusion 38 that has recesses 40 adapted to receive a hinge pin, a flange and a channel (not shown) adapted to receive the armor panel 36, a strike assembly side extrusion 42 that has a bore 44 adapted to receive cable 24, a flange 46 and a channel 47 adapted to receive the armor panel 36. For simplicity, the illustration of flange and channel (not shown) of extrusion 38 has been omitted it being noted that the flange and channel (not shown) of extrusion 38 is similar in construction to flange 66 and channel 67 of hinge side extrusion 62. (see FIG. 7)

Figure 2:
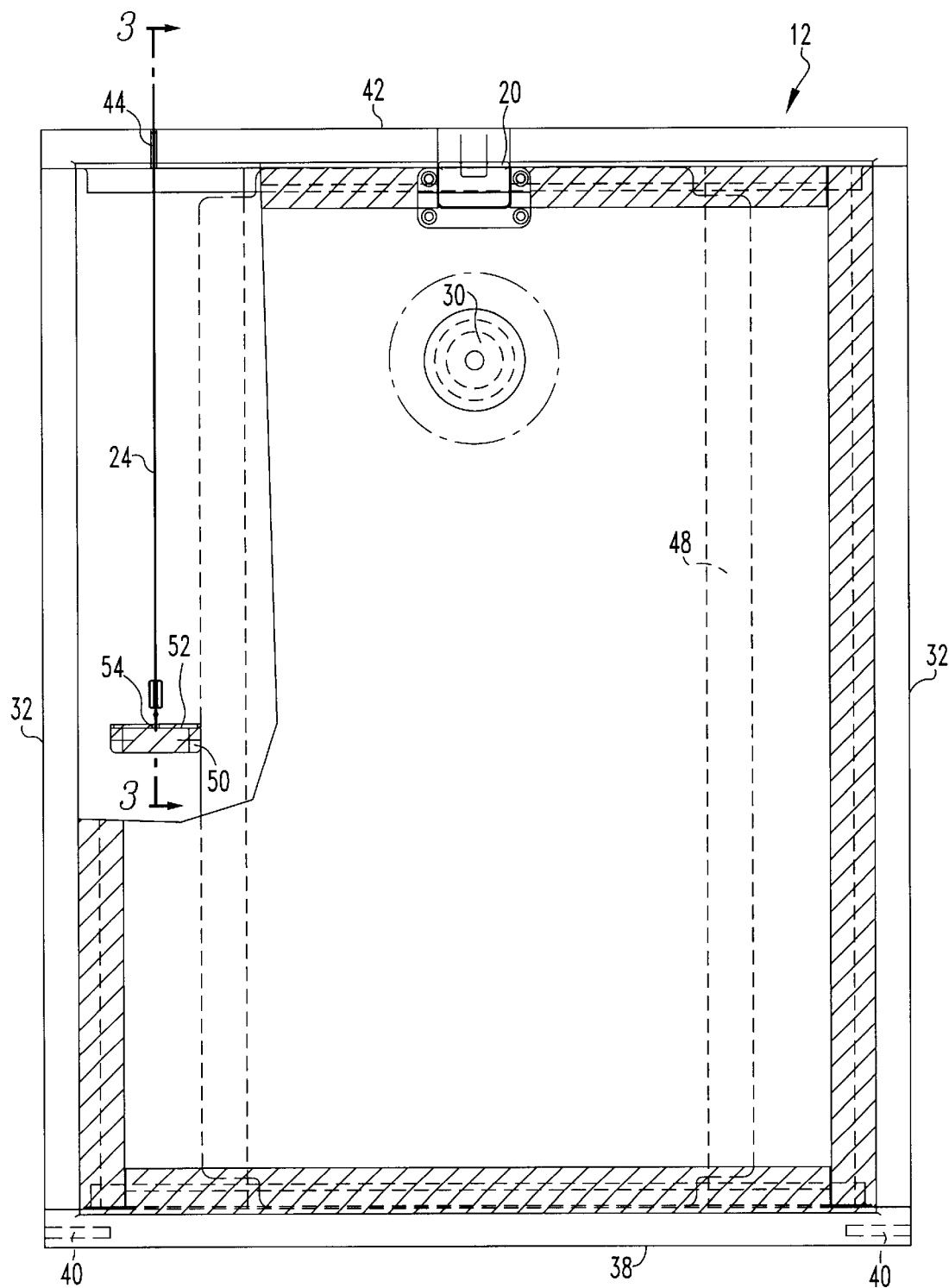
FIG. 2 is a back view of the cockpit side of the first panel of the door showing a portion of the first panel broken away to view the cable with the hatching showing adhesive that has been applied to various components to secure various components together.
Figure 3:
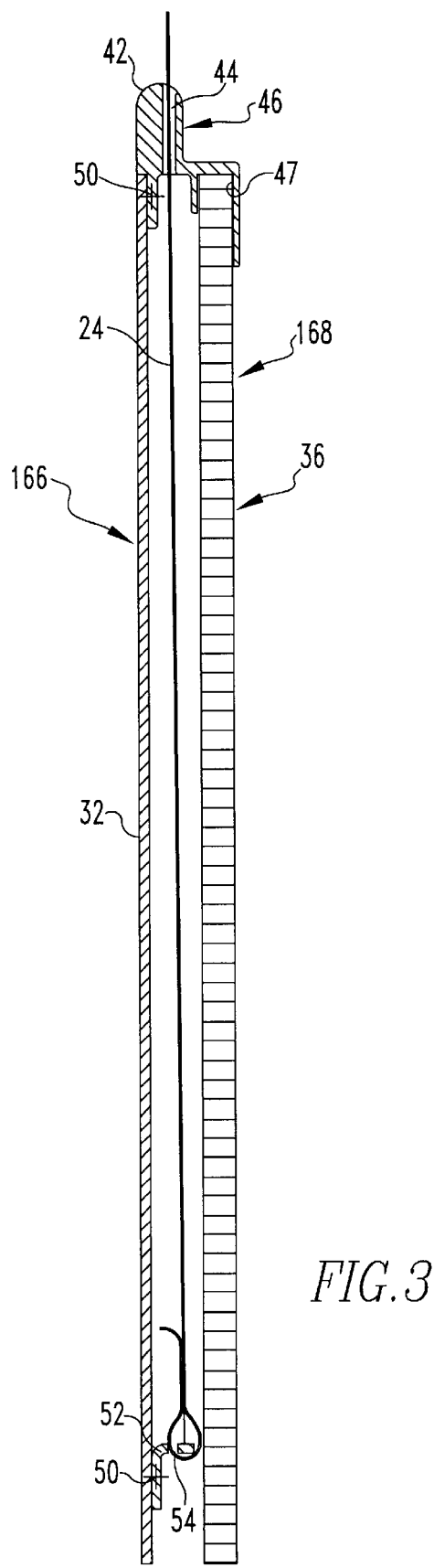
FIG. 3 is a sectional view along line 3—3 of FIG. 2 showing the cable in greater detail.
Figure 4:
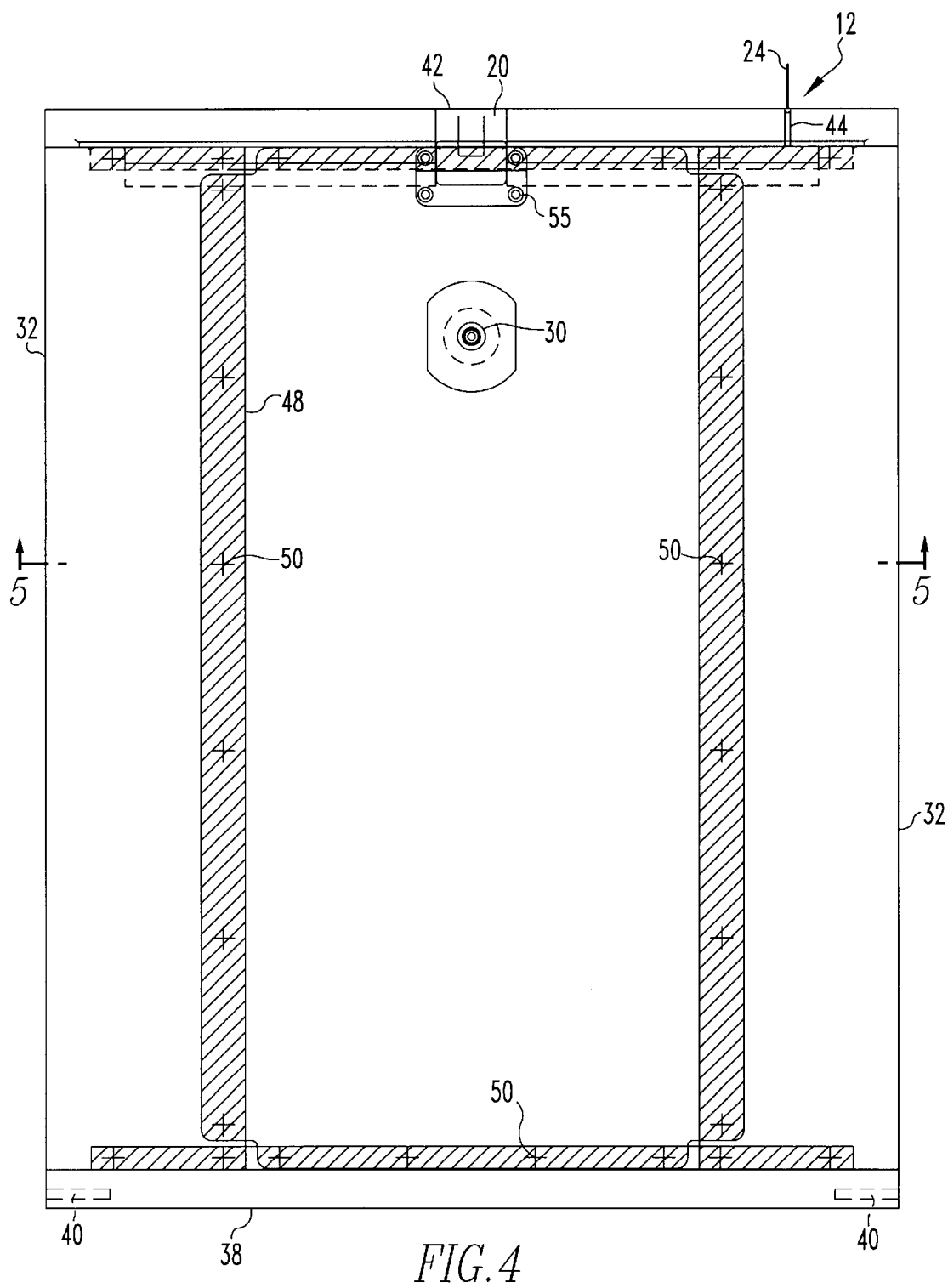
FIG. 4 is a front view of the cabin side of the first panel of the door with the hatching showing adhesive that has been applied to various components to secure various components together.
Figure 5:
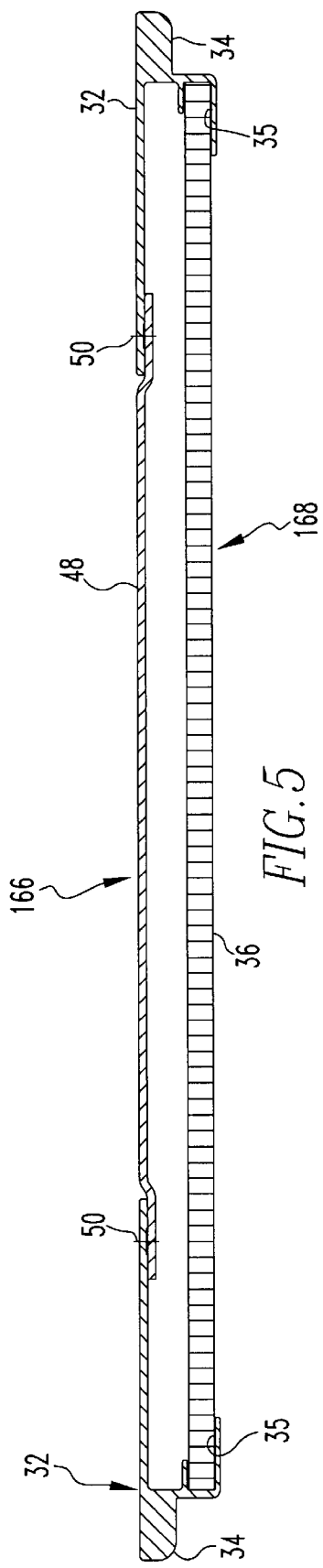
FIG. 5 is a sectional view taken along line 5—5 of FIG. 4 showing structural members of the door, namely, extrusions, sheet and armor panel in greater detail.

A plate or sheet 48 is framed within the extrusions 32, 38 and 42. The armor panel 36 is disposed within the channels 35 and 47 of the extrusions 32 and 42 and the channel (not shown) of extrusion 38. Preferably, the armor panel 36 is secured within the channels of the extrusions 32, 38 and 42 with an effective amount of adhesive. Preferably, the extrusions 32, 38 and 42 and sheet 48 are secured to one another with a plurality of rivets 50 (shown as plus marks on FIGS. 4–5) and an effective amount of adhesive. In an alternative embodiment, rivets 50 could be substituted with spot welds. In FIGS. 2 and 3, a bracket 52 is secured to one of the extrusions 32 with rivets 50. The bracket 52 has a bore 54 that is adapted to receive the cable 24 which passes through the bore 54 and is secured to the bracket 52 by knotting the cable 24. The cable 24 also passes through bore 44 and is secured to extrusion 42 by knotting the cable 24. Other means for securing the cable 24 within the first panel 12 include crimping the cable or affixing the cable within the first panel 12 with other devices. FIGS. 2 and 4 also show a first strike plate assembly 20 that is affixed to the first panel 12 with a plurality of screws 55 that threadedly engage helicoils disposed within the first strike plate assembly 20. As shown in FIGS. 1, 2 and 4, the first panel 12 may contain a viewer assembly 30 that is secured to the plate or sheet 48 and armor panel 36 with an effective amount of adhesive. Alternatively, the viewer assembly 30 could be a camera or other video device that views and/or records activity on the cabin side of the door 10.

FIGS. 6–9 show the various components of the second panel 14 of the door 10 in an assembled relationship. The second panel 14 is constructed of a pair of extrusions 56 that have a flange 58, and a channel 59 adapted to receive an armor panel 60, a hinge side extrusion 62 that has recesses 64 adapted to receive a hinge pin, a flange 66 and a channel 67 adapted to receive the armor panel 60, a latch assembly side extrusion 68 that has a flange and a channel (not shown) adapted to receive the armor panel 60. For simplicity, the illustration of flange and channel (not shown) of extrusion 68 has been omitted it being noted that the flange and channel (not shown) of extrusion 68 is similar in construction to flange 46 and channel 47 of strike assembly side extrusion 42. (see FIG. 3)

Figure 6:
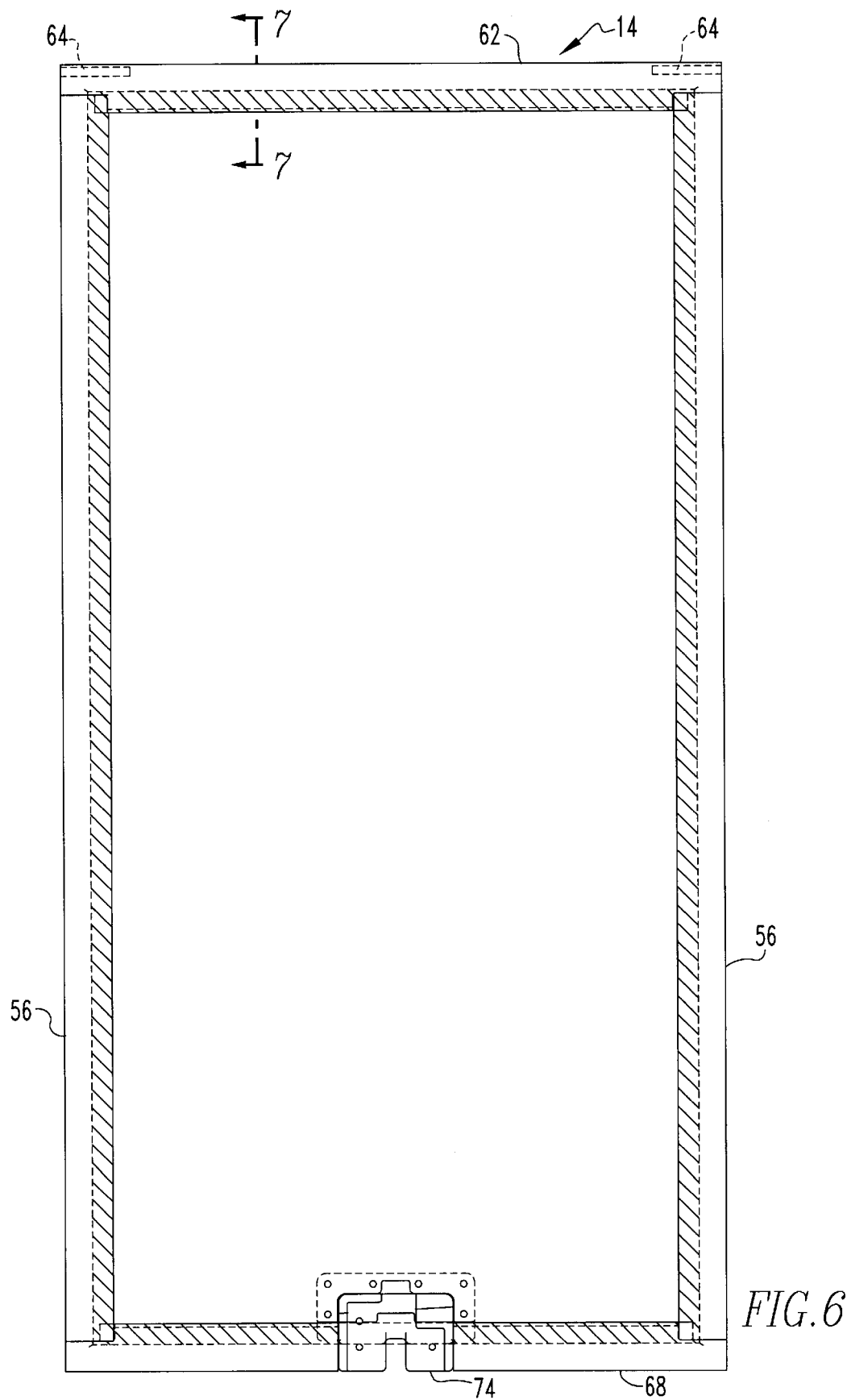
FIG. 6 is a back view of the cockpit side of the second panel of the door with the hatching showing adhesive that has been applied to various components to secure various components together.

A plate or sheet 70 is framed within the extrusions 56, 62 and 68. The armor panel 60 is disposed within the channels 59 and 67 of the extrusions 56 and 62 and the channel (not shown) of extrusion 68. Preferably, the armor panel 60 is secured within the channels of the extrusions 56, 62 and 68 with an effective amount of adhesive. Preferably, the extrusions 56, 62 and 68 and sheet 70 are secured to one another with a plurality of rivets 72 (shown as plus marks on FIGS. 8–9) and an effective amount of adhesive. In an alternative embodiment, rivets 72 could be substituted with spot welds. FIG. 6 shows a latch mount 74 secured to the panel 14 with a plurality of screws 76 that threadedly engage helicoils disposed within the latch mount 74.

Figure 11:
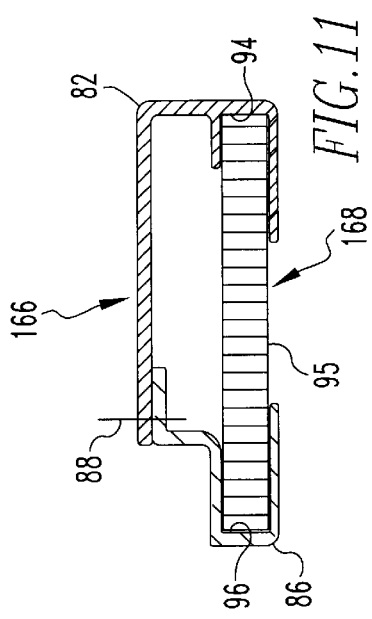
FIG. 11 is a side sectional view taken along line 11—11 of FIG. 10 showing structural members of the door, namely, extrusions and armor panel in greater detail.
Figure 10:
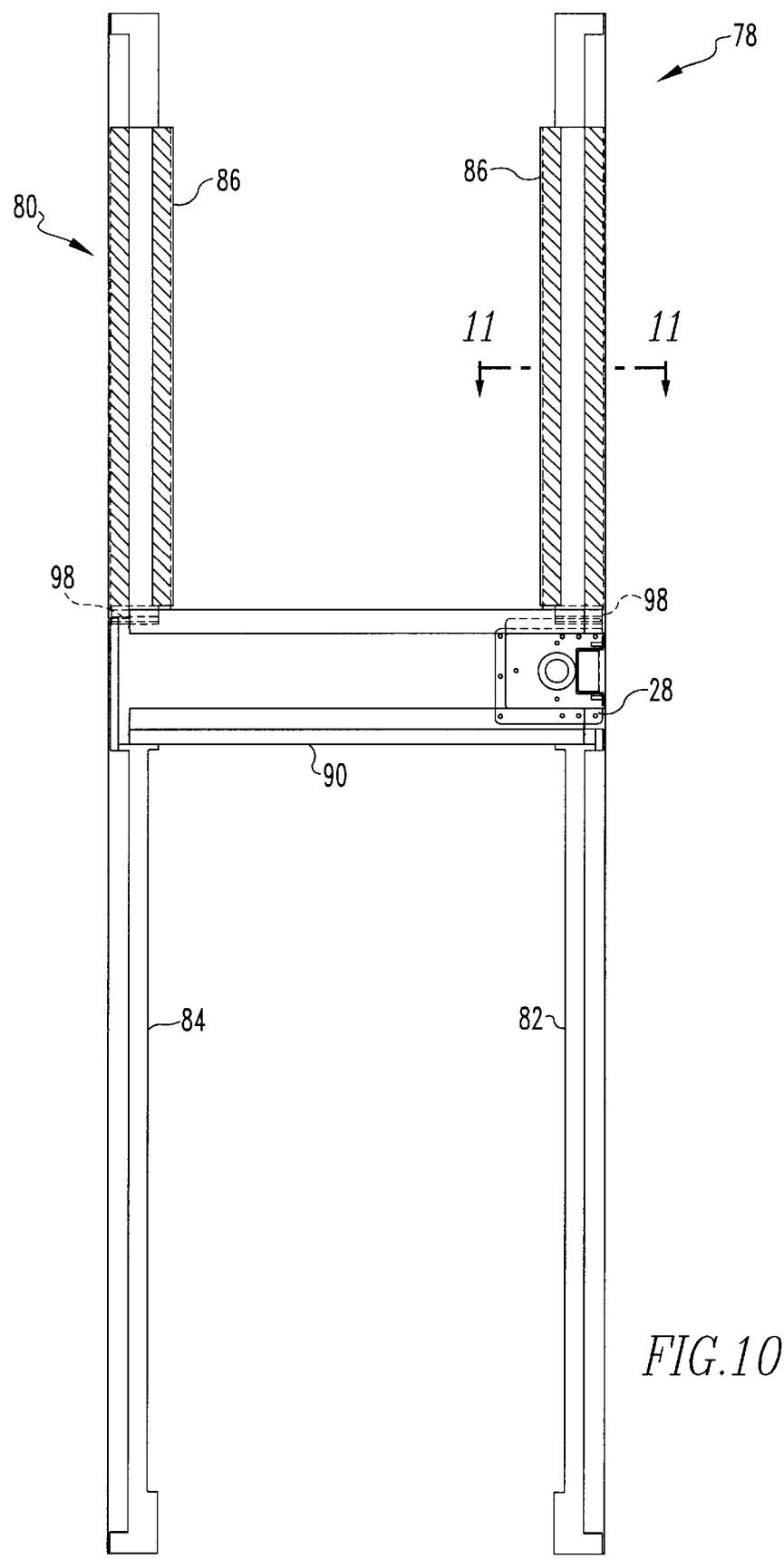
FIG. 10 is a back view of the cockpit side of the door post assembly of the door showing the upper portion of the door post assembly in greater detail with the hatching showing adhesive that has been applied to various components to secure various components together.
Figure 12:
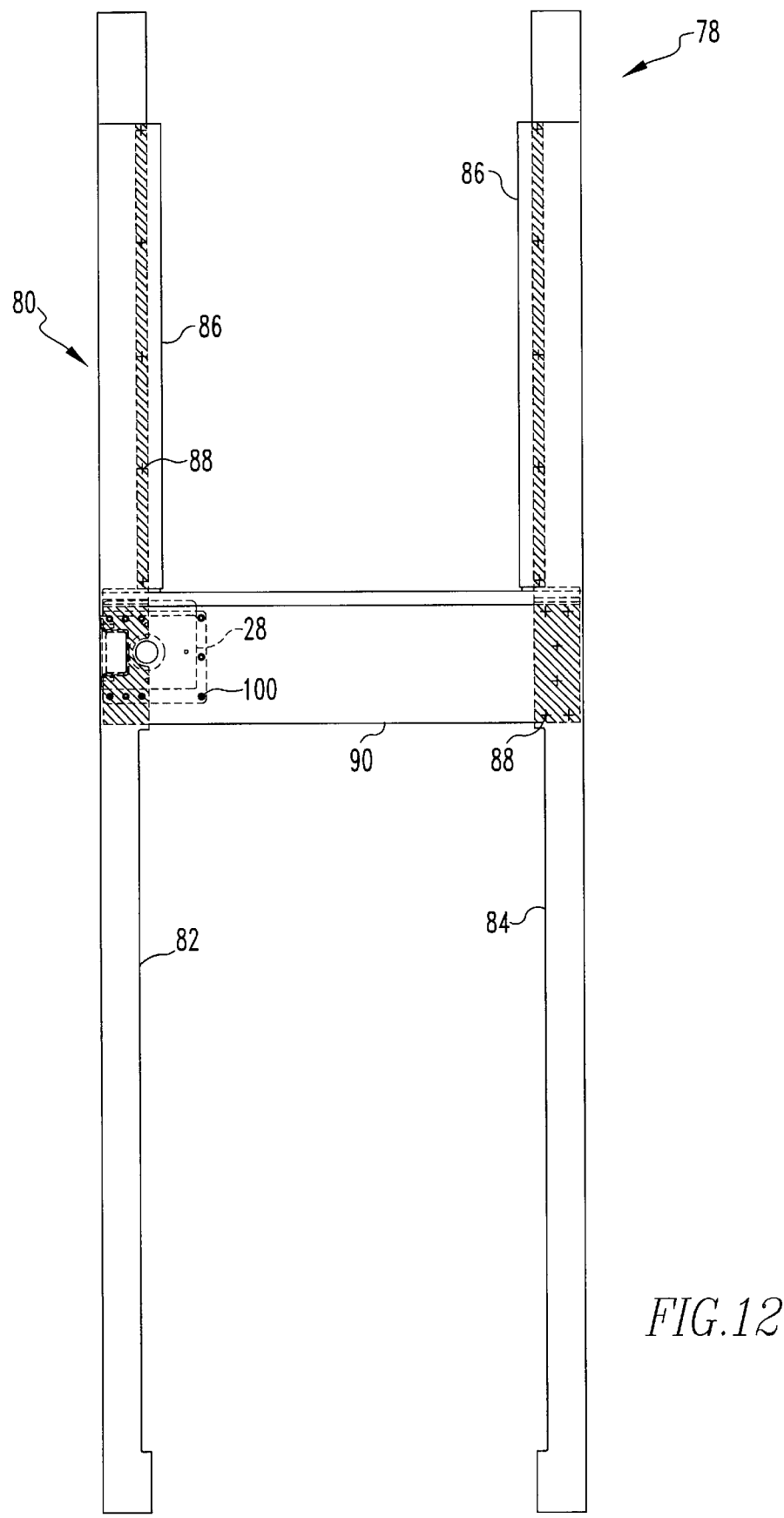
FIG. 12 is a front view of the cabin side of the door post assembly showing the upper portion of the door post assembly in greater detail with the hatching showing adhesive that has been applied to various components to secure various components together.
Figure 22:
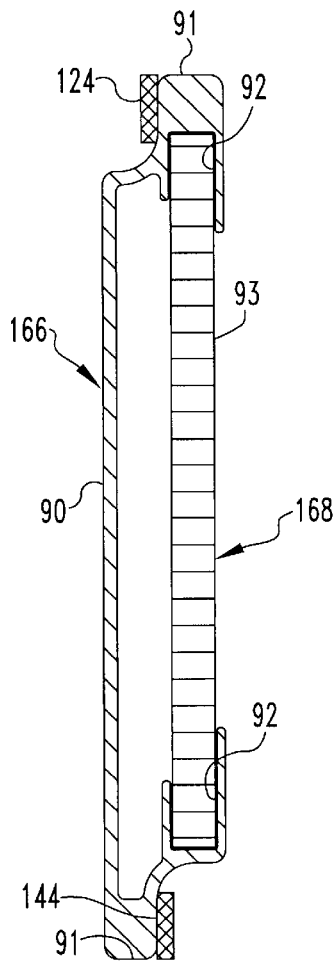
FIG. 22 is a sectional view taken along line 22—22 of FIG. 16 showing structural members of the door, namely, an extrusion, armor panel and foam tape in greater detail.
Figure 20:
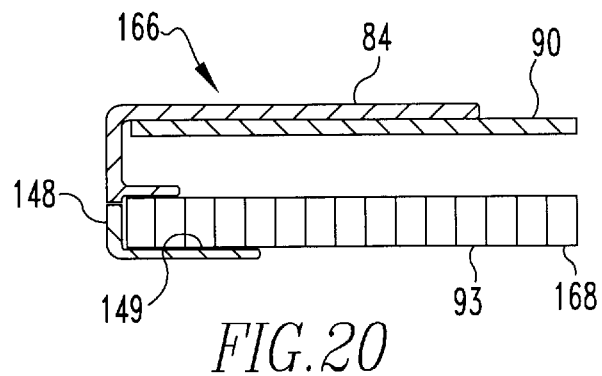
FIG. 20 is a sectional view taken along line 20—20 of FIG. 16 showing structural members of the door, namely, extrusions and armor panel in greater detail.

FIGS. 10–15 show the assembly of the door post assembly 78. FIGS. 10–12 show the assembly of the upper portion 80 of the door post assembly 78 in greater detail. The upper portion 80 of the door post assembly 78 is constructed of door post extrusions 82 and 84 that are affixed to upper extrusions 86 with a plurality of rivets 88 (depicted as plus marks on FIG. 12) and an effective amount of adhesive. Door post extrusions 82 and 84 are affixed to middle tie extrusion 90 with a plurality of rivets 88 and an effective amount of adhesive as well. In an alternative embodiment, rivets 88 could be substituted with spot welds. The middle tie extrusion 90 has a flange 91 and a channel 92 that is adapted to receive an armor panel 93. (see FIG. 22) Preferably, the armor panel 93 is secured with an effective amount of adhesive within the channel 92 and a channel 149 created by adhering a filler extrusion 148 to extrusion 84 with an effective amount of adhesive. (a portion of this is shown in FIG. 20) The door post extrusion 82 has a channel 94 that is adapted to receive armor panel 95 and the door post extrusion 84 has a channel (not shown) that is adapted to receive an armor panel (not shown). For simplicity, the illustration of channel (not shown) of extrusion 84 that is adapted to receive armor panel (not shown) has been omitted it being noted that these components are respectively similar in construction to channel 94 and armor panel 95. Upper extrusions 86 also have a channel 96 adapted to receive armor panel 95 and armor panel (not shown). The armor panel 95 is secured within the channels 94 and 96 of the door post extrusion 82 and one of the upper extrusions 86 with an effective amount of adhesive. Likewise, the armor panel (not shown) is secured within the channels (not shown) of the door post extrusion 84 and the other upper extrusion 86 with an effective amount of adhesive it being understood that such an illustration would be similar in construction to securing armor panel 95 in channels 94 and 96 as shown in FIG. 11. A pair of hinge mounts 150 (one shown in FIG. 23) are spot welded to the extrusions 82 and 84 and middle tie extrusion 90 that have recesses 98 that are adapted to receive hinge pin assemblies that are adapted to engage recesses 40 of first panel 12. Door lock 28 is secured to middle tie extrusion 90 with a plurality of screws 100 that engage helicoils disposed within the door lock 28.

Figure 13:
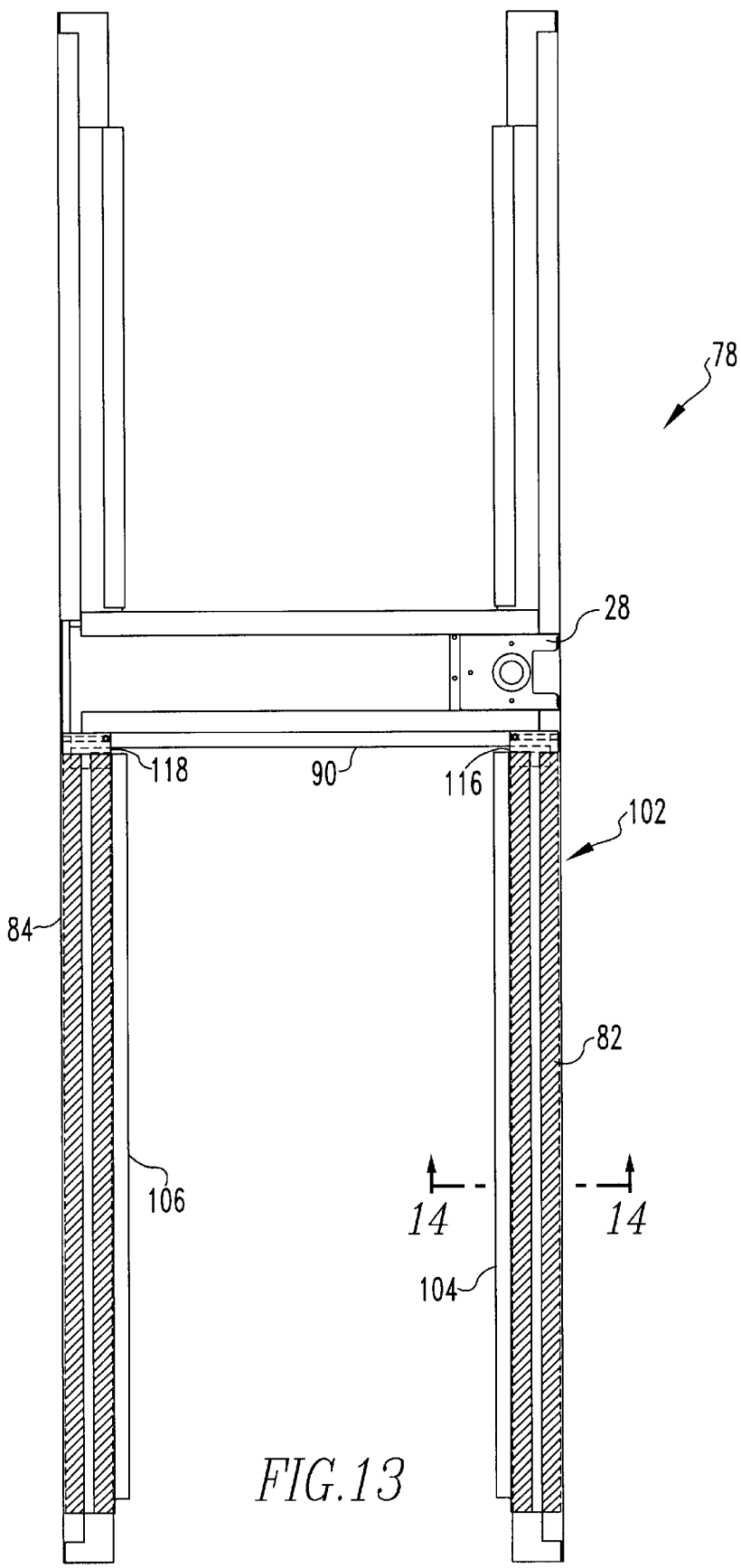
FIG. 13 is a back view of the cockpit side of the door post assembly showing the lower portion of the door post assembly in greater detail with the hatching showing adhesive that has been applied to various components to secure various components together.
Figure 14:
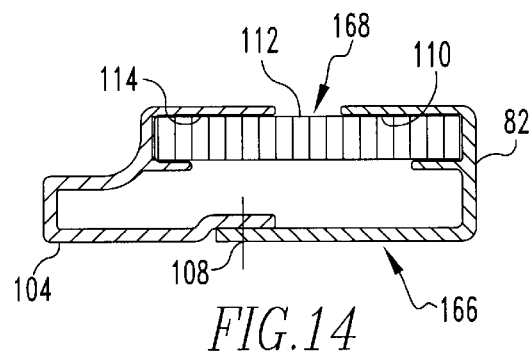
FIG. 14 is a side sectional view taken along line 14—14 of FIG. 13 showing structural members of the door, namely, extrusions and armor panel in greater detail.
Figure 17:
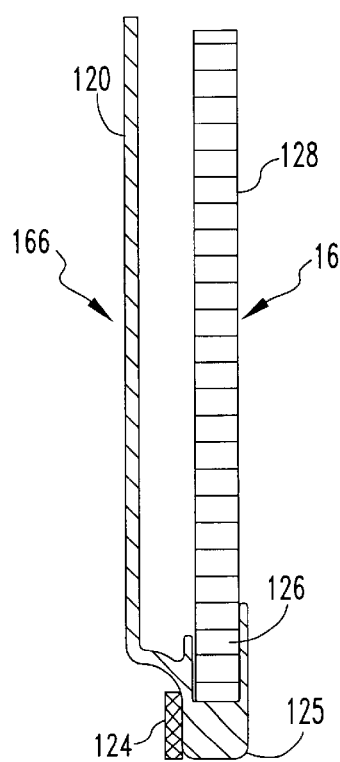
FIG. 17 is a side sectional view taken along line 17—17 of FIG. 16 showing structural members of the door, namely, an extrusion, armor panel and foam tape in greater detail.
Figure 18:
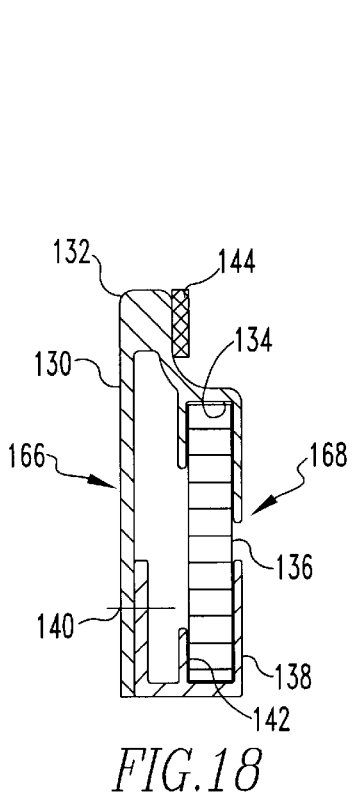
FIG. 18 is a side sectional view taken along line 18—18 of FIG. 16 showing structural members of the door, namely, extrusions, armor panel and foam tape in greater detail.
Figure 15:
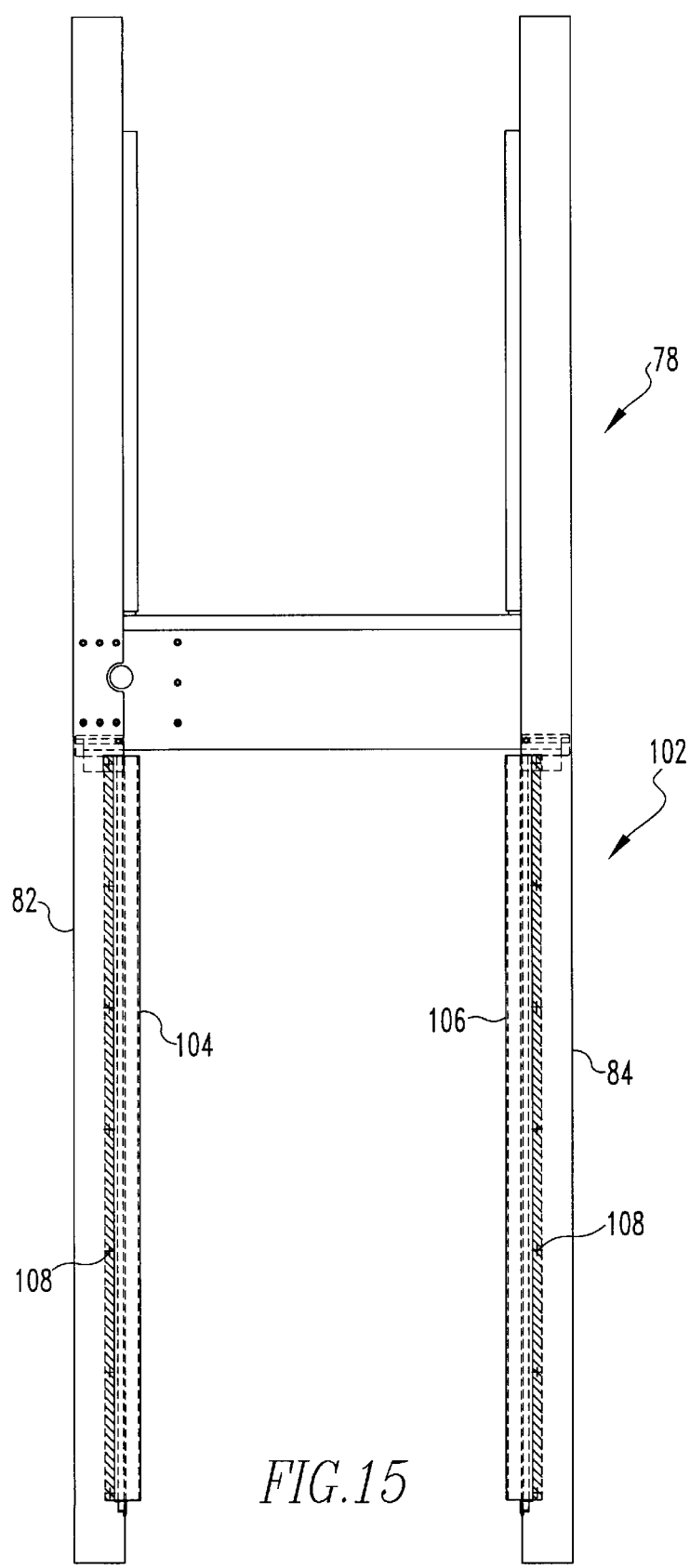
FIG. 15 is a front view of the cabin side of the door post assembly showing the lower portion of the door post assembly in greater detail with the hatching showing adhesive that has been applied to various components to secure various components together.
Figure 16:
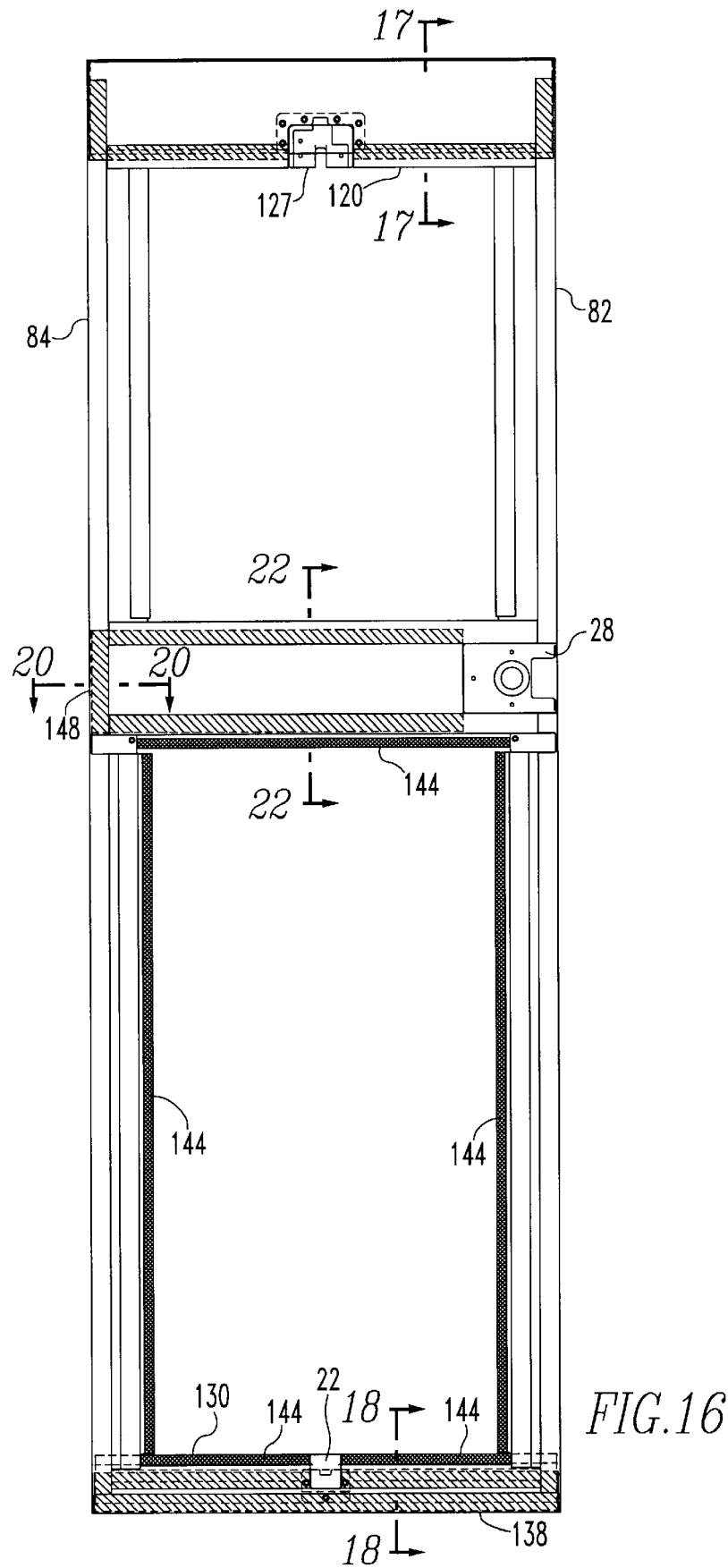
FIG. 16 is a back view of the cockpit side of the final door assembly prior to installation of the panels with the hatching showing adhesive that has been applied to various components to secure various components together.
Figure 19:
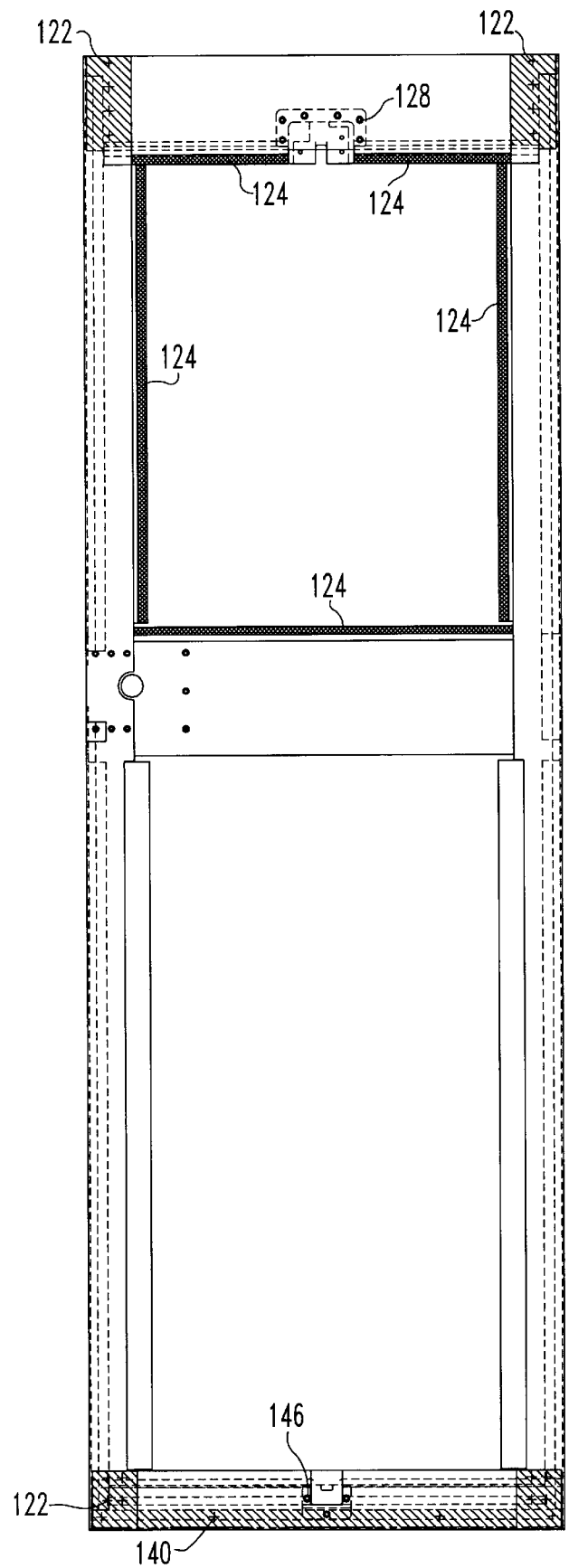
FIG. 19 is a front view of the cabin side of the final door assembly prior to installation of the panels with the hatching showing adhesive that has been applied to various components to secure various components together.

FIGS. 13–15 show the assembly of the lower portion 102 of the door post assembly 78 in greater detail. The lower portion 102 of the door post assembly 78 is constructed of the door post extrusions 82 and 84 that are affixed to lower extrusions 104 and 106 with a plurality of rivets 108 (depicted a plus marks on FIG. 15) and an effective amount of adhesive. In an alternative embodiment, rivets 108 could be substituted with spot welds. The door post extrusion 82 has a channel 110 that is adapted to receive armor panel 112 and the door post extrusion 84 has a channel (not shown) that is adapted to receive an armor panel (not shown). For simplicity, the illustration of channel (not shown) of extrusion 84 that is adapted to receive armor panel (not shown) to be adhered to extrusion 84 and extrusion 106 has been omitted it being noted that the channel (not shown) and armor panel (not shown) are respectively similar in construction to channel 110 and armor panel 112. Lower extrusions 104 and 106 also have a channel 114 and a channel (not shown) adapted to receive armor panel 112 and armor panel (not shown). The armor panel 112 is secured within the channels 110 and 114 of the door post extrusion 82 and lower extrusion 104 with an effective amount of adhesive. Likewise, the armor panel (not shown) is secured within the channels (not shown) of the door post extrusion 84 and the lower extrusion 106 with an effective amount of adhesive it being understood that such an illustration would be similar in construction to securing armor panel 112 in channels 110 and 114 as shown in FIG. 14. A pair of hinge mounts 152 (one shown in FIG. 24) are spot welded to the extrusions 82 and 84 and middle tie extrusion 90 that have recesses 116 and 118 that are adapted to receive hinge pin assemblies that are adapted to engage recesses 64 of second panel 14.

FIGS. 16–22 show the final assembly of the frame of the door 10. Upper cross extrusion 120 is affixed to door post extrusions 82 and 84 with a plurality of rivets 122 and an effective amount of adhesive. In an alternative embodiment, rivets 122 could be substituted with spot welds. The extrusion 120 has a flange 125 and a channel 126 that is adapted to receive armor panel 128. The armor panel 128 is secured within the channel 126 and the channels (not shown) of door post extrusions 82 and 84 with an effective amount of adhesive. For simplicity, the illustration of channels (not shown) adapted to receive armor panel 128 of door post extrusions 82 and 84 has been omitted it being noted that channels (not shown) are similar in construction to channel 110 shown in FIG. 14. Foam tape 124 is adhered along the periphery of the stepped opening that is adapted to receive the first panel 12. A latch mount 127 is secured to the extrusion 120 with a plurality of screws 128 that threadedly engage helicoils disposed within the latch mount 127.

Lower cross extrusion 130 is affixed to door post extrusions 82 and 84 with a plurality of rivets 122 and an effective amount of adhesive. In an alternative embodiment, rivets 122 could be substituted with spot welds. The extrusion 130 has a flange 132 and a channel 134 that is adapted to receive armor panel 136. A close out extrusion 138 is secured to the extrusion 130 with a plurality of rivets 140 and an effective amount of adhesive and to extrusions 82 and 84 with a plurality of rivets 122 and an effective amount of adhesive. In an alternative embodiment, rivets 122 and 140 could be substituted with spot welds. The extrusion 138 has a channel 142 that is adapted to receive armor panel 136. The armor panel 136 is secured within the channel 134 and 142 and the channels (not shown) of door post extrusions 82 and 84 with an effective amount of adhesive. For simplicity, the illustration of channels (not shown) adapted to receive armor panel 136 of door post extrusions 82 and 84 has been omitted it being noted that channels (not shown) are similar in construction to channel 110 shown in FIG. 14. Foam tape 144 is adhered along the periphery of the stepped opening that is adapted to receive the second panel 14. Second strike plate assembly 22 is secured to extrusion 130 with a plurality of screws 146 that threadedly engage helicoils disposed within the strike plate assembly 22. A filler extrusion 148 is provided that has a channel 149 that is adapted to secure the armor panel 93 that is secured within the channel 92 of middle tie extrusion 90. The armor panel 93 is additionally secured within channel 149 with an effective amount of adhesive (see FIG. 20).

Figure 23:
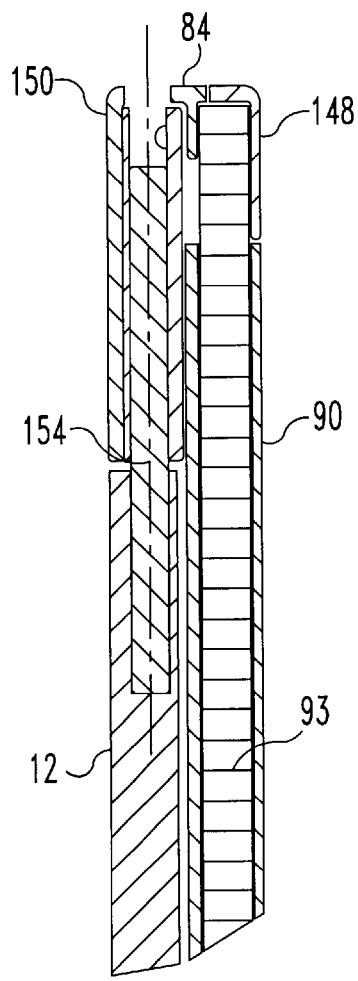
FIG. 23 is a sectional view of the hinge assembly of the first panel.
Figure 24:
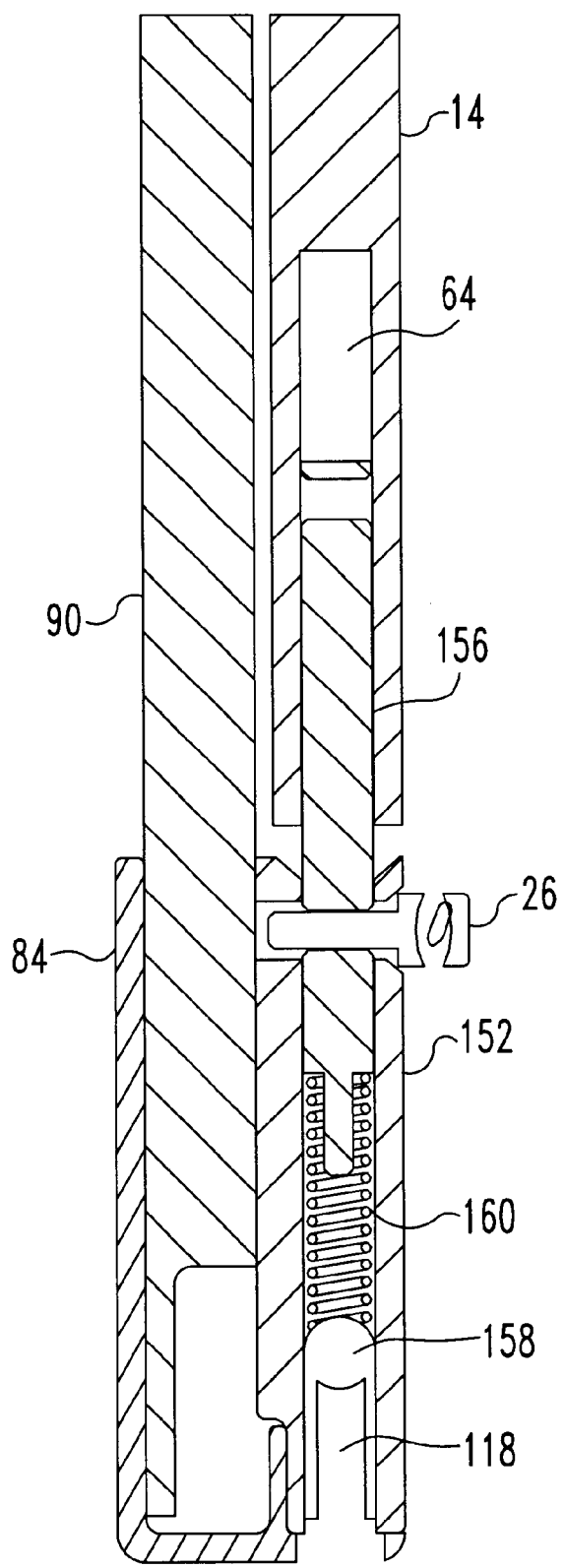
FIG. 24 is a sectional view of the hinge assembly and hinge pin release assembly of the second panel.

With reference to FIG. 23, the first panel 12 is pivotally attached to the door 10 with hinge pins 154 that are disposed in recesses 40 and 98. The hinge pins 154 are secured within recesses 98 with spot welds. With reference to FIG. 24, the second panel 14 is pivotally attached to the door 10 with hinge pins 156 that are disposed in recesses 64, 116 and 118. The hinge pins 156 are secured within recesses 116 and 118 with blind bolts 158. As an added security measure, hinge pin release assembly 26 allows occupants of the cockpit to remove the second panel 14 to exit the cockpit in the event of an emergency. To remove the second panel 14, a person would remove the hinge pin release assembly 26 which would allow spring 160 to exert force on hinge pins 156 to push the hinge pins 156 into the recesses 64 which detaches the pivot attachment of the second panel 14 to the door 10. Then, the person could remove the second panel 14 and exit through the opening created in the door 10 by removal of the second panel 14. Optionally, a strap (not shown) may be attached to the second panel 14. The strap would be grasped by the person removing the second panel 14 to facilitate removal of the second panel 14 after the hinge pins 156 have been disposed within recesses 64.

Figure 21:
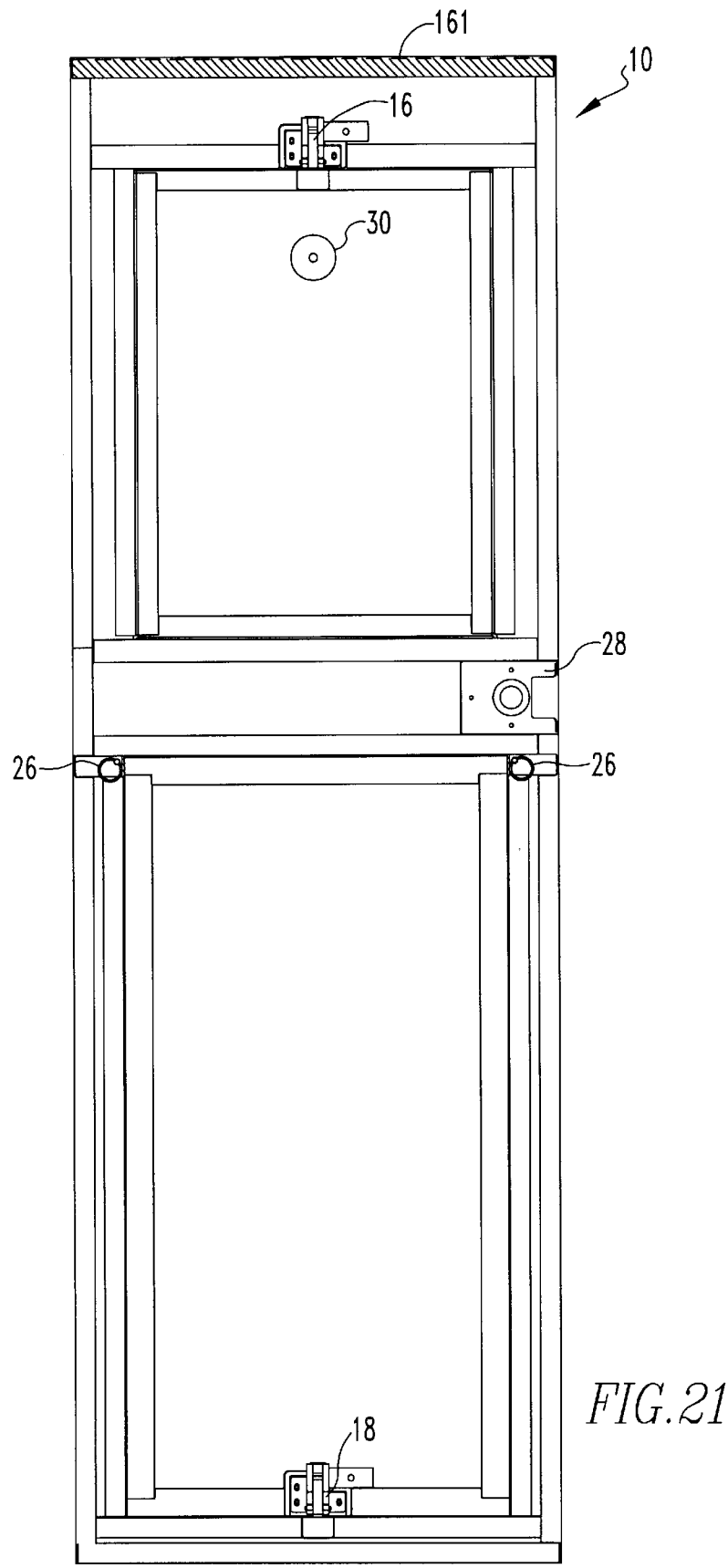
FIG. 21 is a front view of the cabin side of the door after installation of the panels with the hatching showing adhesive that has been applied to various components to secure various components together.
Figure 25:
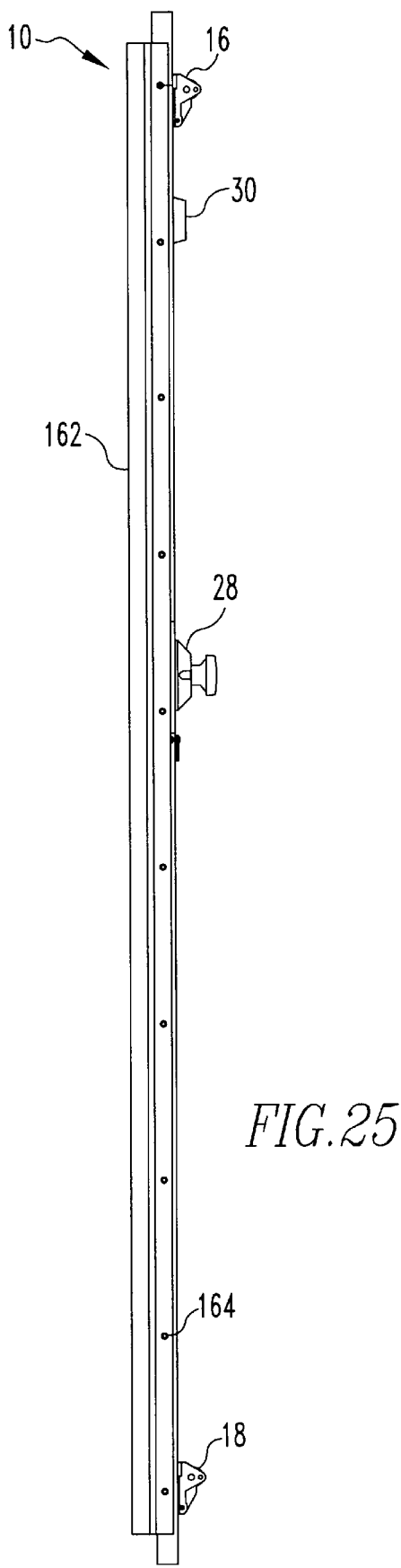
FIG. 25 is a side view of the door showing the first latch assembly, the second latch assembly, the door lock, the viewer assembly, and a hinge in greater detail.
Figure 26:
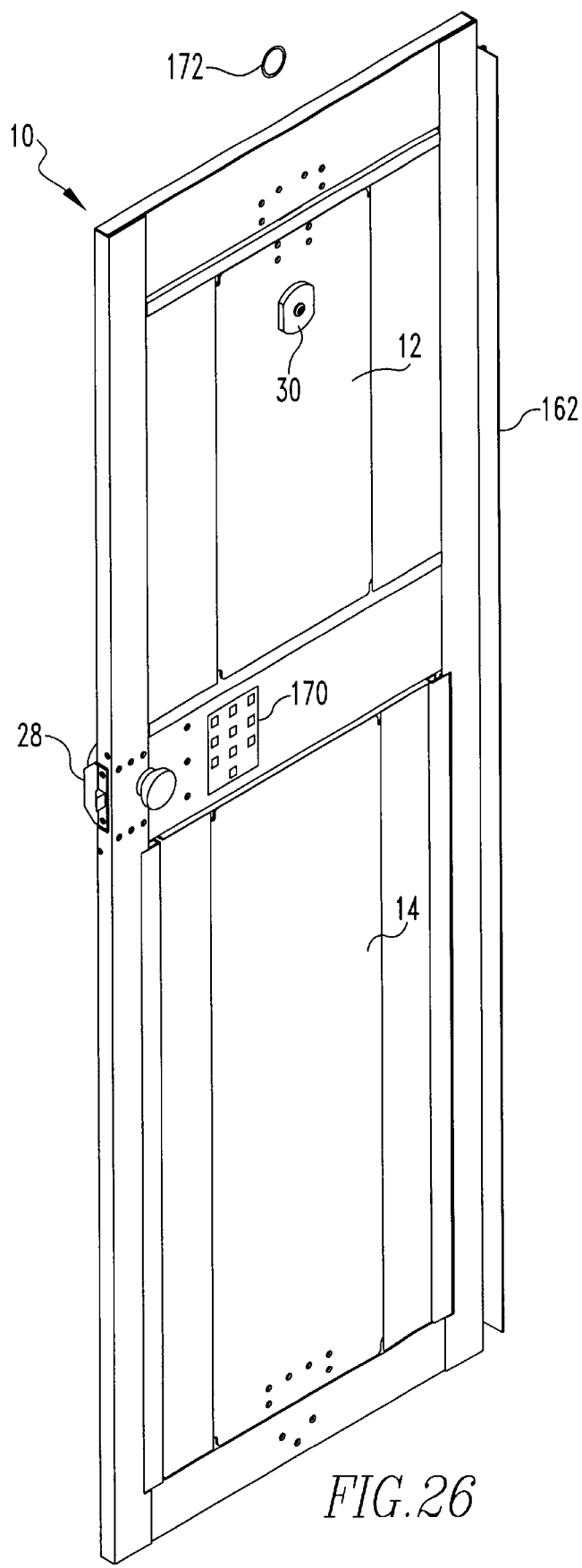
FIG. 26 is a front isometric view of the cabin side of the door showing the door lock, the viewer assembly, the hinge, a data entry device and a camera in greater detail.

As shown in FIG. 21, a first latch is affixed to latch mount 127 with a plurality of screws that threadedly engage helicoils disposed within the latch mount 127 to complete the assembly of first latch assembly 16. A second latch is affixed to latch mount 74 with a plurality of screws that threadedly engage helicoils disposed within the latch mount 74 to complete the assembly of the second latch assembly 18. A close out extrusion 161 similar to close out extrusion 138 is secured to the extrusion 120 with a plurality of rivets (not shown) and an effective amount of adhesive and to extrusions 82 and 84 with a plurality of rivets (not shown) and an effective amount of adhesive. In an alternative embodiment, rivets (not shown) could be substituted with spot welds. The extrusion 161 has a channel (not shown) that is adapted to receive armor panel (not shown). The armor panel (not shown) is secured within the channel 126 and channel (not shown) of close out extrusion 161 with an effective amount of adhesive and the channels (not shown) of door post extrusions 82 and 84 with an effective amount of adhesive. For simplicity, the illustration of the rivets (not shown), channel (not shown) of the close out extrusion 161, armor panel (not shown), channels (not shown) of door post extrusions 82 and 84 have been omitted it being noted that the components are similar in design with respect to the rivets 140, channel 142, armor panel 136 (shown in FIG. 18) and channels 110 respectively. (shown in FIG. 14) As can be seen in FIG. 25, a hinge 162 is affixed to the edge of the door 10 that opposes the edge adjacent to the door lock 28 with a plurality of rivets 164.

As can be seen from the above description, the door 10 is made of two layers including a first layer 166 and a second layer 168. First layer 166 and a portion of second layer 168 can be made of a plurality of metallic extrusions, metallic plates, metallic sheets and combinations thereof. Preferably, the metallic members of first layer 166 and second layer 168 are made of materials that provide impact resistance such as impact resistant aluminum. The term impact resistance as used herein means resistance to force applied to the door 10 to open the door 10 or penetrate the door 10. For example, the following forces could be applied against the door 10 in an attempt to circumvent the impact resistance of the door 10: (i) a person applying the force of their body against the door 10, (ii) hitting the door 10 with a ram or (iii) hitting the door 10 with a projectile such as an arrow or a bullet. The door 10 would also be impact resistant to other similar types of forces such as the forces disclosed in the Regulations and the AC. While the specification discloses a portion of the metallic members as having a flange and/or a channel, it should be readily apparent to those of skill in the art that the metallic members may have one or more flanges and/or one or more channels as well.

A preferred metallic alloy for use in the first layer 166 and the second layer 168 is 2519-T87 aluminum alloy. One skilled in the art would realize that other metallic alloys and tempers could be used in the first layer 166 and the second layer 168 such as 2024, 6061, 6063 and 7075 aluminum alloys. The second layer 168 is also made of armor panels that are disposed within channels of the metallic extrusions, metallic plates or metallic sheets or combinations thereof.

The term armor as used herein means materials that are resistant to forces applied to the armor to penetrate the armor such as projectiles and the like. The armor may be KEVLAR, GLARE or S2 GLASS. KEVLAR is a trademark of E. I. du Pont de Nemours and Company that refers to armor made of poly(phenylenediamine terephthalamide) filaments. GLARE is a trademark of Structural Laminates Company that refers to armor made of metal and fiber reinforced laminates. S2 GLASS is a trademark of Advanced Glass Fiber Yarns LLC that refers to armor made of magnesium aluminosilicate glass fibers and rovings. While reference is made to KEVLAR, GLARE and S2 GLASS herein, other similar armors could be used in the invention such as SPECTRA, MILLENIUM ARMOR or CETEX that would be considered to fall within the scope of this invention. SPECTRA, MILLENIUM ARMOR and CETEX are trademarks of their respective trademark owners.

It should also be noted that the flanges of the extrusions, plate or sheet of the invention have the added advantage of providing overlap between the metallic members. The overlap prevents projectiles from penetrating the door 10 between adjacent extrusions, plate or sheet and combinations thereof.

The door lock 28 may be locked manually by a person in the cockpit or with a switch located within the cockpit. Likewise, the door lock 28 may be released manually by a person in the cockpit or with a switch located within the cockpit. Optionally, the door lock 28 may be released in the following manner from the cabin by entering a code on a data entry device 170 such as a keypad that is in electronic communication with the door lock 28 located on the cabin side of the door 10 to signal the door lock 28 to open to permit entry to the cockpit in the event one or more persons located in the cockpit are incapacitated. After the person on the cabin side enters the code on the data entry device 170, if a person in the cockpit does not acknowledge that code by entering another code on a data entry device located on the cockpit side of the door 10 within a defined period of time, the door lock 28 would be released to permit entry to the cockpit by a person on the cabin side to aid the incapacitated persons. Other means for ingress to the cockpit could be used to aid incapacitated persons in the cockpit that would be considered to fall within the scope of this invention.

Adjacent to the door 10 is a bulkhead that may contain armor or has armor affixed to the bulkhead. The armor may be KEVLAR, GLARE, S2 GLASS or other materials previously mentioned herein.

Preferably, each door 10 is custom built to specific aircraft specifications. Optionally, each door 10 is completely fabricated and fitted with a complete door frame including jambs, flange and strike plate to be delivered as a kit to an aircraft manufacturer. The kit can also contain the door 10 in a light adjustable fixture that aids in installation of the door 10.

Also, the appearance of the door 10 from the cabin side and the cockpit side of the airplane is that of a flat uniform surface that does not show any sign of the different components that make up the first layer 166 and second layer 168 due to a covering sheet that is placed over the layers 166 and 168. On the cabin side of the door 10, one can see a doorknob and a data entry device 170 though. Optionally, the data entry device 170 is placed on the wall or bulkhead adjacent to the door 10. The covering sheet may be a sheet of plastic, vinyl or other materials that meet or exceed FAA requirements. Other indicia such as certifications, placards and warning signs may be disposed on the door 10 on the cockpit side and/or cabin side of the door 10.

The door 10 may be sealed around the perimeter of the door 10 with a seal to seal the door 10 against the jamb, flange and strike plate. A threshold could be added to the floor to close any gaps between the door 10 and the floor of the airplane.

Optionally, the door 10 may be equipped with a camera in lieu of the viewer assembly 30 to monitor the hallway in the cabin outside the door 10. Additionally, one or more back-up cameras 172 could be provided that automatically turn on when the camera is disabled. Also, audible and visual alarms could be provided that are triggered to warn people in the cockpit that a camera has been disabled or that an intruder is attempting to gain entry to the cockpit through the door 10. The camera and the back-up cameras 172 could be in data communication with a video and voice recording device to record the video and voice information received from the camera and/or back-up cameras 172.

Having described the presently preferred embodiments of the invention, it is to be understood that the invention may be otherwise embodied within various functional equivalents disclosed within the scope of the appended claims.

What is claimed is:

1. A door comprising:
   (a) a first layer made of a plurality of metallic members, a portion of the metallic members having one or more channels adapted to receive one or more armor panels;
   (b) a second layer made of the channels of the metallic members and the armor panels disposed within the channels; and
   (c) one or more pivotally attached panels to the door that are adapted to open at a preselected pressure differential across the door.

2. The door of claim 1 wherein the metallic members are selected from the group consisting of extrusions, plates, sheets and combinations thereof.

3. The door of claim 1 wherein the metallic members are manufactured from an aluminum alloy.

4. The door of claim 3 wherein the aluminum alloy is selected from the group consisting of 2519-T87, 2024, 6061, 6063 and 7075.

5. The door of claim 1 wherein the armor panels are manufactured from a composite material.

6. The door of claim 5 wherein the composite material is selected from the group consisting of KEVLAR, GLARE, S2 GLASS, SPECTRA, MILLENIUM ARMOR, CETEX and combinations thereof.

7. The door of claim 1 further comprising a door lock affixed to the door.

8. The door of claim 7 further comprising one or more data entry devices that are in electronic communication with the door lock that are adapted to actuate and release a locking mechanism of the door lock.

9. The door of claim 1 further comprising a means for monitoring one side of the door from another side of the door.

10. The door of claim 9 further comprising a data recorder in data communication with the means for monitoring.

11. The door of claim 1 further comprising a plurality of latch assemblies and a plurality of strike plate assemblies affixed to the door, the latch assemblies being adapted to engage the strike plate assemblies and to release the strike plate assemblies at a preselected pressure differential across the door.

12. The door of claim 1 further comprising one or more hinge pin release assemblies affixed to the door that are adapted to detach the pivot attachment of one or more of the panels.

13. The door of claim 1 wherein a portion of the metallic members have one or more flanges that are adapted to provide overlap between the metallic members.

14. The door of claim 1 further comprising a door frame affixed to the door which is available as a kit.

15. The door of claim 1 further comprising a hinge affixed to an edge of the door.

16. The door of claim 1 further comprising a sheet disposed on one side and another side of the door.

17. The door of claim 16 wherein a plurality of indicia is disposed on the door.

18. A door comprising:
(a) a first layer made of a plurality of metallic members, a portion of the metallic members having one or more channels adapted to receive one or more armor panels;
(b) a second layer made of the channels of the metallic members and the armor panels disposed within the channels; and
(c) one or more pivotally attached panels to the door that are adapted to open at a preselected pressure differential across the door, wherein a portion of the metallic members have one or more flanges that are adapted to provide overlap between the metallic members.

19. A kit for hanging a door in an airplane, the kit comprising:
(a) a door having a first layer and a second layer, the first layer made of a plurality of metallic members, a portion of the metallic members having one or more channels adapted to receive one or more armor panels, the second layer made of the channels of the metallic members and the armor panels disposed within the channels;
(b) one or more panels pivotally attached to the door that are adapted to open at a preselected pressure differential across the door;
(c) a door lock affixed to the door;
(d) a plurality of latch assemblies and a plurality of strike plate assemblies affixed to the door, the latch assemblies being adapted to engage the strike plate assemblies and to release the strike plate assemblies at a preselected pressure differential across the door;
(e) a hinge affixed to an edge of the door; and
(f) a door frame affixed to the door.

* * * * *